(12) United States Patent
Han et al.

(10) Patent No.: US 8,134,888 B2
(45) Date of Patent: Mar. 13, 2012

(54) METHOD AND APPARATUS OF LOCATION TRACKING

(75) Inventors: Jae Joon Han, Seoul (KR); Won-Chul Bang, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 350 days.

(21) Appl. No.: 12/457,947

(22) Filed: Jun. 25, 2009

(65) Prior Publication Data

US 2010/0128568 A1    May 27, 2010

(30) Foreign Application Priority Data

Nov. 27, 2008  (KR) .......................... 10-2008-0118897

(51) Int. Cl.
*G01S 3/80*    (2006.01)
(52) U.S. Cl. ........................ 367/127; 367/128
(58) Field of Classification Search .................. 367/127
See application file for complete search history.

(56) References Cited

U.S. PATENT DOCUMENTS

| | | | | |
|---|---|---|---|---|
| 5,644,299 A | * | 7/1997 | Cruickshank | ............... 340/617 |
| 6,141,293 A | * | 10/2000 | Amorai-Moriya et al. | ... 367/127 |
| 6,487,516 B1 | * | 11/2002 | Amorai-Moriya | ............ 702/152 |
| 7,324,021 B2 | * | 1/2008 | Soma | .............................. 341/33 |
| 7,362,655 B1 | * | 4/2008 | Hester | ............................ 367/127 |
| 7,575,371 B1 | * | 8/2009 | Yakymyshyn et al. | ........ 374/119 |
| 7,623,413 B2 | * | 11/2009 | McFarland | ..................... 367/127 |
| 2007/0203667 A1 | * | 8/2007 | Watanabe et al. | ............. 702/158 |
| 2008/0037370 A1 | * | 2/2008 | Crowell | ......................... 367/127 |
| 2008/0144442 A1 | * | 6/2008 | Combee et al. | ................ 367/131 |
| 2008/0253225 A1 | * | 10/2008 | Welker et al. | ..................... 367/17 |
| 2008/0259729 A1 | * | 10/2008 | Griffin et al. | .................. 367/117 |
| 2008/0259730 A1 | * | 10/2008 | Di Federico | ................... 367/118 |

FOREIGN PATENT DOCUMENTS

| | | |
|---|---|---|
| JP | 11-326513 | 11/1999 |
| KR | 10-2005-0095401 | 9/2005 |
| KR | 10-2007-0035236 | 3/2007 |

* cited by examiner

*Primary Examiner* — Thomas Tarcza
*Assistant Examiner* — James Hulka
(74) *Attorney, Agent, or Firm* — Staas & Halsey LLP

(57) ABSTRACT

Disclosed are an apparatus and a method of location tracking. The location tracking apparatus may calculate a location of an object using an ultrasound. In this instance, an intensity of the used ultrasound may be determined based on a distance to the object, thereby reducing unnecessary power consumption.

15 Claims, 4 Drawing Sheets

METHOD AND APPARATUS OF LOCATION TRACKING

CROSS-REFERENCE TO RELATED APPLICATIONS

This application claims the benefit of Korean Patent Application No. 10-2008-0118897, filed on Nov. 27, 2008, in the Korean Intellectual Property Office, the disclosure of which is incorporated herein by reference.

BACKGROUND

1. Field

Example embodiments relate to a location tracking apparatus and a location tracking method, and more particularly, to a location tracking apparatus and location tracking method that may control an intensity of an ultrasound and an emission period used to track a location.

2. Description of the Related Art

Ultrasound is sound waves with a frequency greater than an audible frequency and cannot be heard by a human.

Since a refractive index of the ultrasound is greater than a refractive index of light, propagation is possible even though a small obstacle is in front. Also, since there is an advantage in that designing a complex filter is not necessary, the ultrasound may be used to measure an absolute distance of an object.

As an example of measuring the absolute distance of the object using ultrasound, there may be a method of using a time difference between a transmitting time of the ultrasound from a transmitting unit and a receiving time of the transmitted ultrasound at a receiving unit, when the transmitting unit and receiving unit of the ultrasound are synchronized. As another example, there may be a method that transmits ultrasound together with an infrared ray or a radio frequency from the transmitting unit and uses a difference between a velocity of sound and a velocity of light.

Ultrasound may be used to measure a location of an object together with a sensor that may provide relative location information, such as an inertial measurement unit (IMU), and the like.

SUMMARY

According to example embodiments, there may be provided an apparatus to track a location of an object, the apparatus including an intensity determining unit to determine an intensity of an ultrasound based on a distance between the object and the location tracking apparatus, an emitting unit to emit an ultrasound having the determined intensity, a sensing unit to sense the emitted ultrasound, and a location calculating unit to calculate the location of the object based on sensing time information of when the ultrasound is sensed, and update the distance based on the calculated location.

In this instance, the intensity determining unit may determine the intensity of the ultrasound in proportion to the distance.

Also, the location tracking apparatus may further include an emission period determining unit to determine an emission period of the ultrasound based on motion information of the object, where the emitting unit emits the ultrasound according to the determined emission period.

In this instance, the emission period determining unit may determine the emission period based on the distance and the updated distance.

According to example embodiments, there may be provided a method of tracking a location, the method including determining an intensity of an ultrasound based on a distance between an object and a location tracking apparatus, emitting an ultrasound having the determined intensity, sensing the emitted ultrasound, calculating a location of the object based on sensing time information of when the ultrasound is sensed; and updating the distance based on the calculated location.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of example embodiments will become apparent and more readily appreciated from the following description, taken in conjunction with the accompanying drawings of which.

DETAILED DESCRIPTION OF EMBODIMENTS

Figure 1:
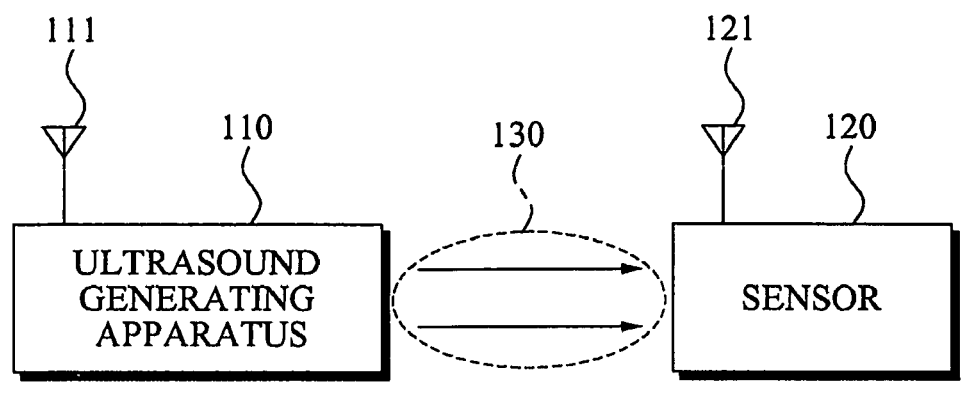
FIG. 1 is a block diagram illustrating a detailed configuration of a location tracking apparatus according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 is a block diagram illustrating a detailed configuration of a location tracking apparatus according to example embodiments.

The location tracking apparatus 100 according to example embodiments may include an ultrasound generating apparatus 110 and a sensor 120. Hereinafter, a function of each element will be described in detail.

The ultrasound generating apparatus 110 emits an ultrasound 130, and the sensor 120 senses the emitted ultrasound 130.

In this instance, the sensor exists on an object. In other words, the sensor 120 is installed on the object, a location of which is intended to be tracked. As an example, when the object is a car, the sensor 120 may be installed on a part of the car, and when the object is a human, the human may carry the sensor 120.

The ultrasound generating apparatus 110 may emit an ultrasound having a predefined intensity according to a predefined period, and may continuously measure the location of the object. In this instance, although a single ultrasound generating apparatus 110 is illustrated in FIG. 1, at least three ultrasound generating apparatuses 110 may be used to accurately measure the location of the object.

When the ultrasound is emitted to a space, as an emission distance increases, the intensity of the ultrasound is attenuated due to a diffusion loss caused by diffraction of the ultrasound and a loss of energy that is absorbed by a medium.

Accordingly, when the sensor 120 is located at a long distance from the ultrasound generating apparatus 110 and the ultrasound generating apparatus 110 emits an ultrasound having weak intensity, the sensor 120 may not accurately sense the emitted ultrasound due to attenuation of the intensity, thereby encountering difficulty in tracking the location of the object.

Conversely, when the sensor 120 is located at a short distance from the ultrasound generating apparatus 110 and the ultrasound generating apparatus 110 emits the ultrasound having weak intensity, the sensor may sense the emitted ultrasound, and thus, tracking for the location of the object is possible. In this instance, however, when the ultrasound generating apparatus 110 emits an ultrasound having strong intensity, unnecessary power may be expended. Also, in the case that the object is a human, when the ultrasound generating apparatus 110 emits the ultrasound having strong intensity, the ultrasound may have a negative effect on a human body.

That is, the ultrasound generating apparatus 110 may need to emit an ultrasound having appropriate intensity according to a distance to the object, the location of which is intended to be tracked.

Also, in the case that the object substantially moves, when the ultrasound generating apparatus 110 emits an ultrasound at a short period, the location of the object may not be accurately measured due to the movement of the object.

Conversely, in the case that the object moves insubstantially, when the ultrasound generating apparatus 110 emits the ultrasound at a long period, unnecessary power consumption may occur and the ultrasound may have a negative effect on the human body carrying the sensor 120.

That is, the ultrasound generating apparatus 110 may emit the ultrasound at an appropriate period according to an amount of the movement of the object, the location of which is intended to be tracked.

In other words, the ultrasound generating apparatus 110 may emit the ultrasound having the appropriate intensity at the appropriate period according to the distance to the object and the amount of the movement of the object. In this instance, when the ultrasound is initially emitted, an intensity of the emitted ultrasound and an emission period may be predetermined values.

Subsequently, the ultrasound emitted from the ultrasound generating apparatus 110 may be sensed by the sensor 120 on the object.

The sensor 120 extracts information (hereinafter, location tracking information) to track the location of the object from the sensed ultrasound.

As an example, the sensor 120 may extract a time value (hereinafter, a first time value) of when the ultrasound is sensed by the sensor 120 as the location tracking information.

As another example, when the ultrasound generating apparatus 110 further emits an infrared (IR) or a radio frequency (RF) in addition to the ultrasound, the sensor 120 may extract the first time value and a second time value of when the IR or the RF is sensed by the sensor 120, as the location tracking information.

Since the first time value and the second time value used as the location tracking information may relate to a sensing time of the sensor 120, hereinafter, the location tracking information related to the sensing time of the sensor 120 is referred to as sensing time information.

The sensor 120 transmits the extracted location tracking information to the ultrasound generating apparatus 110. In this instance, the extracted location tracking information may be transmitted/received through antennas 111 and 121. In this instance, the transmitted location tracking information may further include relative location information with respect to the object, such as acceleration of the object, angular velocity, and the like.

The ultrasound generating apparatus 110 calculates the location of the object based on the received information.

To calculate the location of the object, first, the ultrasound generating apparatus 110 calculates a distance to the object based on the sensing time information.

When the distance to the object is calculated, when the sensing time information only includes the first time value, the ultrasound generating apparatus 110 calculates a difference between a time value (hereinafter, a third time value) of when the ultrasound is emitted and the first time value, and calculates the distance to the object based on the distance between the first time value and the third time value and the velocity of the ultrasound. In this instance, it is assumed that a timer of the ultrasound generating apparatus 110 and a timer of the sensor 120 are synchronized.

When the distance to the object is calculated, when the sensing time information includes the first time value and the second time value, the ultrasound generating apparatus 110 may calculate the distance to the object based on the first time value, the second time value, the velocity of the ultrasound, and the velocity of either the IR or the RF. In this instance, the timer of the ultrasound generating apparatus 110 and the timer of the sensor 120 may not need to be synchronized.

Subsequently, the ultrasound generating apparatus 110 may calculate the location of the object using the calculated distance to the object and the relative location information with respect to the object.

As described above, since the ultrasound generating apparatus 110 periodically emits the ultrasound, the ultrasound generating apparatus 110 determines an intensity of the emitted ultrasound based on the calculated distance to the object, and emits an ultrasound having the determined intensity for future use.

Also, since the relative location information of the object relates to movement of the object, the ultrasound generating apparatus 110 controls an emission period of the ultrasound based on the relative location information of the object.

Therefore, the location tracking apparatus 100 tracks the location of the object using the ultrasound. In this instance, the location tracking apparatus 100 may control an intensity of the used ultrasound and emission period, thereby reducing unnecessary power consumption and preventing the negative effect that may potentially affect the human body.

Figure 2:
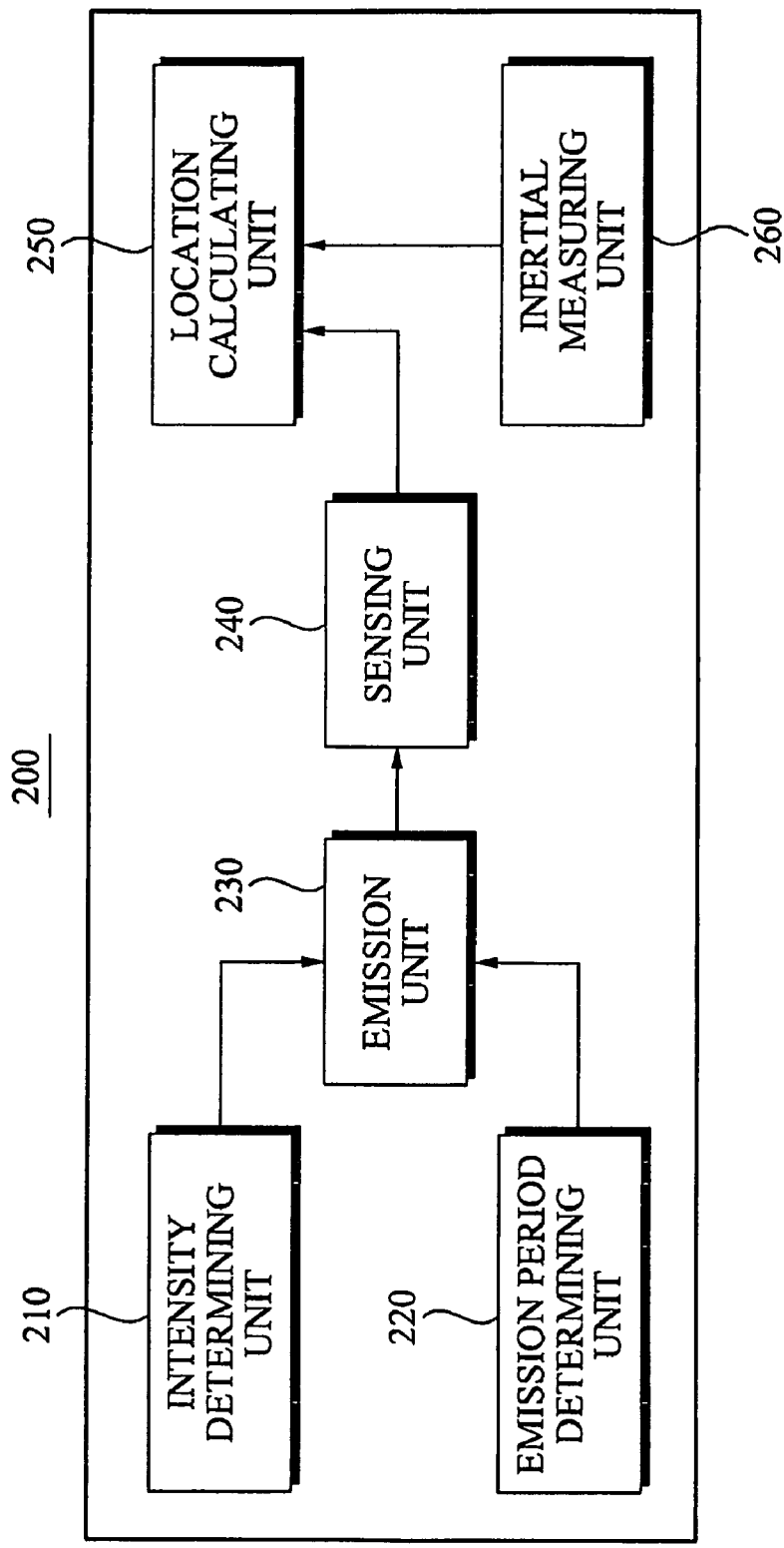
FIG. 2 is a block diagram illustrating a detailed configuration of a location tracking apparatus according to other example embodiments.

FIG. 2 is a block diagram illustrating a detailed configuration of a location tracking apparatus according to other example embodiments.

A location tracking apparatus 200 according to example embodiments includes an intensity determining unit 210, an emission unit 230, a sensing unit 240, and a location calculating unit 250. In this instance, according to example embodiments, the location tracking apparatus 200 may further include an emission period determining unit 220, and may further include an inertial measuring unit 260. Hereinafter, a function for each element will be described in detail.

The intensity determining unit 210 determines an intensity of an ultrasound based on a distance between an object and the location tracking apparatus 200.

As described above, since the ultrasound is attenuated in proportion to an emission distance and unnecessary power may be expended when an intensity of an emitted ultrasound is excessively strong, the intensity of the emitted ultrasound is required to have an appropriate value based on a distance to the object.

Accordingly, the intensity determining unit 210 may determine the intensity of the ultrasound based on the distance between the object and the location tracking apparatus 200.

According to example embodiments, the intensity determining unit 210 may determine the intensity of the ultrasound in proportion to the distance. That is, since the intensity of the ultrasound is attenuated as an emission distance is long, the intensity determining unit 210 may determine the intensity of the ultrasound in proportion to the distance.

In this instance, the location tracking apparatus 200 continuously calculates a location of the object according to a specific period, and thus, the distance between the object and the location tracking apparatus 200 may be drawn from an object location calculated in a previous operation.

The emission unit 230 emits an ultrasound having the intensity determined in the intensity determining unit 210 and the sensing unit 240 senses the ultrasound emitted from the emission unit 230.

The ultrasound sensed in the sensing unit 240 may be the ultrasound that is emitted from the emission unit 230 and directly received. In this instance, the sensing unit 240 may exist on the object. Also, in this instance, the distance between the location tracking apparatus and the object may be a distance between the emission unit 230 and the sensing unit 240.

The location calculating unit 250 calculates the location of the object based on sensing time information of when the ultrasound is sensed by the sensing unit 240.

Prior to calculating the location, the location calculating unit 250 calculates the distance to the object, and in this instance, the sensing time information may be used.

According to example embodiments, the sensing time information may include a difference between a time value (a first time value) of when the ultrasound is sensed in the sensing unit 240 and a time value (a third time value) of when the ultrasound is emitted from the emission unit 230.

In this instance, the location calculating unit 250 may calculate the distance between the first time value and the third time value, and calculate the distance to the object based on the difference between the first time value and the third time value and a velocity of the ultrasound. In this instance, a timer of the emission unit 230 and a timer of the sensing unit 240 may need to be synchronized.

As an example, the distance to the object may be determined according to Equation 1 as given below.

$$d = v_u \times (t_1 - t_3)$$ [Equation 1]

Here, d is a distance to the object, $v_u$ is a velocity of an ultrasound, $t_1$ is a first time value of when the ultrasound is sensed in the sensing unit 240, and $t_3$ is a third time value of when the ultrasound is emitted from the emission unit 230.

Also, according to other example embodiments, the emission unit 230 may further emit an electromagnetic wave, the sensing unit 240 may further sense the emitted electromagnetic wave, and the sensing time information may further include a difference between a time value (the first time value) of when the ultrasound is sensed in the sensing unit 240 and a time value (a second time value) of when the electromagnetic wave is sensed in the sensing unit 240. As an example, the electromagnetic wave may be either the IR or the RF.

In this instance, the location calculating unit 250 may calculate the distance to the object based on the difference between the first time value and the second time value, the velocity of the ultrasound, and the velocity of the electromagnetic wave. Also, in this instance, the timer of the emission unit 230 and the timer of the sensing unit 240 may not need to be synchronized.

As an example, the distance to the object may be determined according to Equation 2 as given below.

$$d = \frac{(t_1 - t_2) \times v_u \times v_e}{v_u - v_e}$$ [Equation 2]

Here, d is a distance to the object, $v_u$ is a velocity of an ultrasound, $v_e$ is a velocity of an electromagnetic wave, $t_1$ is a first time value of when the ultrasound is sensed in the sensing unit 240, and $t_2$ is a second time value of when the electromagnetic wave is sensed in the sensing unit 240.

As described above, according to example embodiments, the location tracking apparatus 200 further includes the inertial measuring unit 260, and the inertial measuring unit 260 measures inertial data with respect to the object.

According to example embodiments, the inertial data may include at least one of acceleration data of the object and angular velocity data of the object. In this instance, the inertial measuring unit 260 may be an Inertial Measurement Unit (IMU).

The location calculating unit 250 may calculate the location of the object based on the calculated distance to the object and the inertial data of the object measured in the inertial measuring unit 260.

Also, the location calculating unit 250 updates the distance based on the calculated location of the object.

As described above, the location tracking apparatus 200 may further include an emission period determining unit 220.

The emission period determining unit 220 determines an emission period of the ultrasound emitted from the emission unit 230 based on object motion information.

When the object substantially moves, when the emission unit 230 emits the ultrasound at a short period, the location of the moving object may not be accurately measured due to the movement of the object. When the object moves insubstantially, when the emission unit 230 emits the ultrasound at a long period, unnecessary power consumption may occur and the ultrasound may have a negative effect on the human body carrying the sensor 120. Accordingly, the emission period determining unit 220 determines an appropriate emission period of the ultrasound based on the motion information of the object.

According to example embodiments, the motion information may include inertial data.

That is, when the velocity of the object or the velocity of the angular velocity is substantial, it may be determined that the object substantially moves, and thus, the emission period determining unit 220 increases the emission period. When the velocity of the object or the velocity of the angular velocity is insubstantial, it may be determined that the object insubstantially moves, and thus, the emission period determining unit 220 decreases the emission period.

Also, according to example embodiments, the emission period determining unit 220 may determine the emission period based on the distance to the object and the updated distance to the object.

That is, when a difference between the distance to the object and the updated distance to the object is substantial, the emission period determining unit 220 increases the emission period since an amount of the movement is substantial. When a difference between the distance to the object and the updated distance to the object is insubstantial, the emission period determining unit 220 decreases the emission period since the amount of the movement is insubstantial.

According to example embodiments, when the difference between the distance to the object and the updated distance to the object is greater than or equal to a predetermined first threshold, the emission period determining unit 220 may increase the emission period. Also, when the difference between the distance to the object and the updated distance to the object is less than or equal to a predetermined second threshold, the emission period determining unit 220 may decrease the emission period. In this instance, the first threshold is greater than or equal to the second threshold.

That is, when the distance between the distance to the object and the updated distance to the object is greater than or equal to the first threshold, the emission period determining unit 220 may increase the emission period, when the distance between the distance to the object and the updated distance to the object is not greater than or equal to the first threshold and not less than or equal to the second threshold, the emission period determining unit 220 may not change the emission period, and when the distance between the distance to the object and the updated distance to the object is not greater than or equal to the first threshold and is less than or equal to the second threshold, the emission period determining unit 220 may decrease the emission period.

In this instance, the first threshold and the second threshold may be arbitrarily determined by a user.

Figure 3:
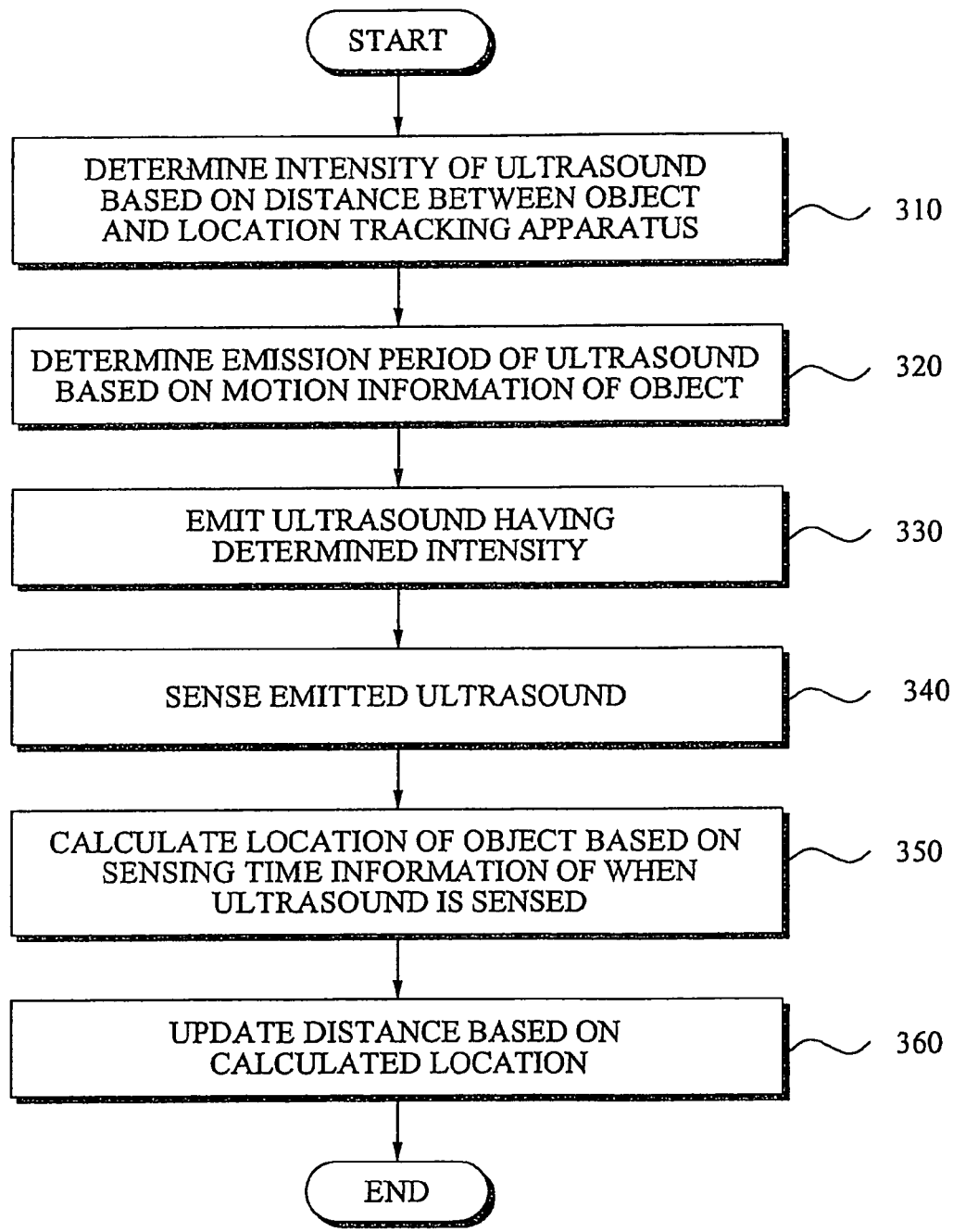
FIGS. 3 and 4 are flowcharts illustrating a method of tracking a location according to example embodiments.
Figure 4:
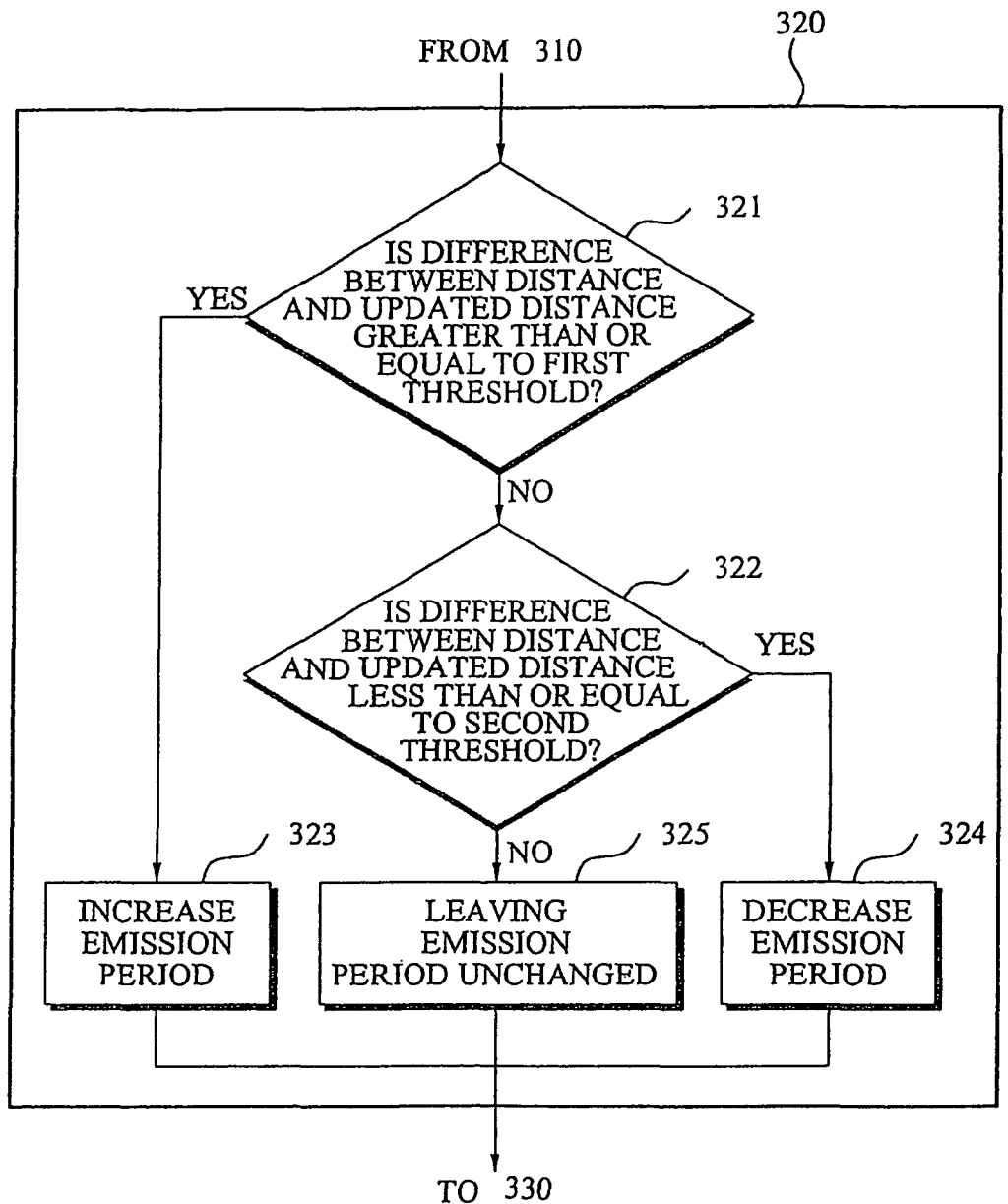

FIGS. 3 and 4 are flowcharts illustrating a method of tracking a location according to example embodiments.

Hereinafter, a process performed in each operation will be described with reference to FIGS. 3 and 4.

First, an intensity of an ultrasound may be determined based on a distance between a location of an object and a location tracking apparatus in operation 310.

Operation 310 reduces unnecessary power consumption due to emission of an ultrasound having excessively strong intensity and solves the difficulty in measuring a location due to emission of an ultrasound having a weak intensity.

According to example embodiments, the intensity of the ultrasound may be determined in proportion to the distance to the object in operation 310.

The distance between the object and the location tracking apparatus may be drawn from a location of the object calculated in a previous operation.

In operation 320, an emission period of the ultrasound is determined based on motion information of the object.

That is, when the object substantially moves, when the ultrasound is emitted at a short period, the location of the moving object may not be accurately measured. When the object moves insubstantially, when the ultrasound is emitted at a long period, unnecessary power consumption may occur. Accordingly, in operation 320, an appropriate emission period of the ultrasound is determined.

According to example embodiments, motion information may include inertial data.

That is, in operation 320, when the acceleration of the object or the angular velocity is substantial, it may be determined that the object substantially moves, thereby increasing the emission period, and when the acceleration of the object or the angular velocity is insubstantial, it may be determined that the object insubstantially moves, thereby decreasing the emission period.

In operation 330, an ultrasound having the determined intensity is emitted. In this instance, an emission period of the emitted ultrasound is the emission period determined in operation 320.

In operation 340, the emitted ultrasound is sensed.

In operation 350, a location of the object is calculated based on sensing time information of when the ultrasound is sensed.

To calculate the location, the distance to the object is calculated and the location of the object is based on the calculated distance to the object in operation 350.

In this instance, the distance to the object may be calculated based on the sensing time information.

According to example embodiments, the sensing time information may include a difference between a time value (a first time value) of when the ultrasound is sensed in operation 340 and a time value (a third time value) of when the ultrasound is emitted in operation 330.

In this instance, in operation 350, the difference between the first time value and the third time value is calculated, and the distance to the object may be calculated based on the velocity of the ultrasound and the difference between the first time value and the third time value. Also, in this instance, the processes performed in operations 330 and 340 may need to be synchronized. As an example, the distance to the object may be determined according to Equation 1.

Also, according to other example embodiments, an electromagnetic wave is further emitted in operation 330, the emitted electromagnetic wave is further sensed in operation 340, and the sensing time information may further include a difference between the time value (the first time value) of when the ultrasound is sensed in operation 340 and a time value (a second time value) of when the electromagnetic wave is sensed in a sensing unit 240. As an example, the electromagnetic wave may be either the IR or the RF.

In this instance, the distance to the object may be calculated based on the difference between the first time value and the second time value, the velocity of the ultrasound, and a velocity of the electromagnetic wave in operation 350. As an example, the distance to the object may be determined according to Equation 2.

According to example embodiments, a location tracking method may further include an operation (not illustrated) of measuring an inertial data. As an example, the inertial data may include at least one of the acceleration data of the object and angular data of the object.

Subsequently, the location of the object may be calculated using the calculated distance to the object and the inertial data of the object measured by an inertial measuring unit 250 in operation 350.

In operation 360, the distance is updated based on the calculated location of the object.

Hereinafter, operation 320 will be described in detail with reference to FIG. 4.

In operation 321, a difference between the distance to the object and the updated distance is compared with a predetermined first threshold.

When it is determined that the difference between the distance to the object and the updated distance is greater than or equal to the first threshold in operation 321, an emission period is increased in operation 323.

When it is determined that the difference between the distance to the object and the updated distance is less than the first threshold in operation 321, the difference between the distance to the object and the updated distance is compared with a predetermined second threshold in operation 322.

When it is determined that the difference between the distance to the object and the updated distance is less than or equal to the second threshold in operation 322, the emission period is decreased in operation 324.

When it is determined that the difference between the distance to the object and the updated distance is greater than the second threshold in operation 322, the emission period is not changed in operation 325.

A few example embodiments of the location tracking method have been shown and described, and a configuration of the location tracking apparatus described in FIG. 2 is applicable to the present example embodiment. Accordingly, detailed descriptions thereof will be omitted.

The location tracking method according to the above-described example embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

What is claimed is:

1. An apparatus to track a location of an object, the apparatus comprising:
   an intensity determining unit determining an intensity of an ultrasound pulse based on a stored distance between the object and the location tracking apparatus;
   an emission period determining unit determining an emission period of the ultrasound pulse based on motion information of the object;
   an emitting unit emitting an ultrasound pulse having the determined intensity based on the determined emission period;
   a sensing unit sensing the emitted ultrasound pulse; and
   a location calculating unit calculating the location of the object based on sensing time information of when the ultrasound pulse is sensed, and updating the stored distance based on the calculated location.

2. The apparatus of claim 1, wherein the intensity determining unit determines the intensity of the ultrasound pulse in proportion to the stored distance.

3. The apparatus of claim 1, further comprising:
   an inertial measuring unit measuring inertial data with respect to the object, the location calculating unit calculating the location of the object based on the stored distance and the measured inertial data.

4. The apparatus of claim 1, wherein the motion information includes inertial data.

5. The apparatus of claim 1, wherein the emission period determining unit determines the emission period based on the previously stored distance and the updated distance.

6. The apparatus of claim 5, wherein the emission period determining unit increases the emission period when a difference between the previously stored distance and the updated distance is greater than or equal to a predetermined first threshold.

7. The apparatus of claim 5, wherein the emission period determining unit decreases the emission period when a difference between the previously stored distance and the updated distance is less than or equal to a predetermined second threshold.

8. The apparatus of claim 1, wherein the sensing time information includes a difference between a time value of when the ultrasound pulse is emitted from the emitting unit and a time value of when the ultrasound pulse is sensed by the sensing unit.

9. The apparatus of claim 1, wherein the emitting unit further emits an electromagnetic wave, the sensing unit further senses the emitted electromagnetic wave, and the sensing time information includes a difference between a time value of when the ultrasound pulse is sensed and a time value of when the electromagnetic wave is sensed.

10. A method of tracking a location, the method comprising:
    determining an intensity of an ultrasound pulse based on a stored distance between an object and a location tracking apparatus;
    determining an emission period of the ultrasound pulse based on motion information of the object;
    emitting an ultrasound pulse having the determined intensity based on the determined emission period;
    sensing the emitted ultrasound pulse;
    calculating a location of the object based on sensing time information of when the ultrasound pulse is sensed; and
    updating the stored distance based on the calculated location.

11. The method of claim 10, wherein the determining of the intensity of the ultrasound pulse determines the intensity of the ultrasound pulse in proportion to the stored distance.

12. The method of claim 10, wherein the determining of the emission period determines the emission period based on the previously stored distance and the updated distance.

13. The method of claim 12, wherein the determining of the emission period increases the emission period when the difference between the previously stored distance and the updated distance is greater than or equal to a predetermined first threshold.

14. The method of claim 12, wherein the determining of the emission period decreases the emission period when the difference between the previously stored distance and the updated distance is less than or equal to a predetermined second threshold.

15. A non-transitory computer readable recording medium storing a program to cause a processor to implement the method of claim 10.

* * * * *